(12) United States Patent
Matsumoto et al.

(10) Patent No.: US 10,967,584 B2
(45) Date of Patent: Apr. 6, 2021

(54) METHOD OF FORMING REINFORCING FIBER SUBSTRATE

(71) Applicant: MITSUBISHI AIRCRAFT CORPORATION, Aichi (JP)

(72) Inventors: Kensuke Matsumoto, Tokyo (JP); Toru Nishikawa, Tokyo (JP)

(73) Assignee: Mitsubishi Aircraft Corporation, Aichi (JP)

( * ) Notice: Subject to any disclaimer, the term of this patent is extended or adjusted under 35 U.S.C. 154(b) by 224 days.

(21) Appl. No.: 16/089,339

(22) PCT Filed: Mar. 24, 2017

(86) PCT No.: PCT/JP2017/011964
§ 371 (c)(1),
(2) Date: Sep. 27, 2018

(87) PCT Pub. No.: WO2017/170206
PCT Pub. Date: Oct. 5, 2017

(65) Prior Publication Data
US 2019/0118493 A1 Apr. 25, 2019

(30) Foreign Application Priority Data

Mar. 31, 2016 (JP) .............................. JP2016-071850

(51) Int. Cl.
*B29C 70/34* (2006.01)
*B29C 39/10* (2006.01)
(Continued)

(52) U.S. Cl.
CPC ............ *B29C 70/342* (2013.01); *B29C 39/10* (2013.01); *B29C 39/22* (2013.01); *B29C 70/222* (2013.01);
(Continued)

(58) Field of Classification Search
None
See application file for complete search history.

(56) References Cited

FOREIGN PATENT DOCUMENTS

| JP | H07-195509 A | 8/1995 |
|---|---|---|
| JP | H11-216740 A | 8/1999 |

(Continued)

OTHER PUBLICATIONS

International Search Report issued in corresponding International Application No. PCT/JP2017/011964 dated May 16, 2017 (3 pages).

(Continued)

*Primary Examiner* — Monica A Huson
(74) *Attorney, Agent, or Firm* — Osha Bergman Watanabe & Burton LLP (57) ABSTRACT

The method of forming reinforced fiber base material is provided with: arranging, on the mold having a projection with a upper surface, a platform that is adjacent to the projection and has a flat upper surface at the same height as the upper surface of the projection; forming the laminate by placing reinforced fiber base material in layers on the upper surface of the projection; placing an end of the laminate in the width direction extending out of the upper surface of the projection, on the upper surface of the platform, with the end of the laminate in the width direction sandwiched in a vertical direction by a pair of the films of which outer ends in the width direction are fixed to each other; and removing the platform and pulling out the pair of the films while shaping the laminate along the projection.

7 Claims, 8 Drawing Sheets

(51) Int. Cl.
*B29C 39/22* (2006.01)
*B29C 70/22* (2006.01)
*B29C 70/44* (2006.01)
*B29K 105/08* (2006.01)

(52) U.S. Cl.
CPC ............ *B29C 70/228* (2013.01); *B29C 70/44* (2013.01); *B29K 2105/0872* (2013.01)

(56) References Cited

FOREIGN PATENT DOCUMENTS

| | | | |
|---|---|---|---|
| JP | 4967405 | B2 | 7/2012 |
| JP | 2014-51065 | A | 3/2014 |

OTHER PUBLICATIONS

Written Opinion issued in corresponding International Application No. PCT/JP2017/011964 dated Oct. 11, 2018 (10 pages).

METHOD OF FORMING REINFORCING FIBER SUBSTRATE

TECHNICAL FIELD

The present invention relates to methods of forming reinforcing fiber substrate (reinforcing fibers, reinforcement fiber base material) mainly in the VaRTM (vacuum assisted resin transfer molding) method.

BACKGROUND ART

The VaRTM method is a molding method of performing resin impregnation in which a preform member composed of composite material such as reinforcing fiber substrate (for example, glass fiber or carbon fiber) is sealed with a vacuum bag film or a molding, and vacuum suction is performed to inject resin into it (for example, see Patent Document 1 below). Use of the VaRTM method has an advantage in that composite material can be molded without necessity for an expensive autoclave (pressurizing furnace) or the like.

As upstream steps of the above resin impregnation, a layup process, shaping step, and hot compaction step are performed for forming a preform member from reinforcing fiber substrate.

The layup process and the shaping step are steps for forming a fiber preform by placing fabric of the reinforcing fiber substrate in layers on a mold and shaping the fiber preform. The hot compaction step is a step for raising the temperature of the shaped fiber preform in the evacuation state. To keep the shape formed at the hot compaction step, thermoplastic powder is adhered to the reinforcing fiber substrate in advance. Note that for parts having a large number of layers, the layup process, shaping step, and hot compaction step are repeated to form layers in multiple steps before the resin impregnation in some cases.

PRIOR ART DOCUMENT

Patent Document

Patent Document 1: Japanese Patent No. 4967405

SUMMARY OF THE INVENTION

Problems to be Solved by the Invention

In the above steps, there is a problem that in shaping the fiber preform having multiple layers of fabric of the reinforcing fiber substrate, the layers (fabric) get loose, and some fibers in the fabric are broken, and folded and stacked in the fiber preform in some cases, which degrades the strength of the preform member.

In light of the above technical problem, an object of the present invention is to propose methods of forming reinforcing fiber substrate that make it possible to shape the fiber preform surely without the layers of the fiber preform getting loose and prevent the degradation of the strength of the preform member.

Means for Solving the Problems

A method of forming reinforcing fiber substrate according to a first aspect of the invention to solve the above problem is characterized in that a fiber preform is shaped along a mold while films that sandwiches an end of the fiber preform from above and below is being pulled out.

A method of forming reinforcing fiber substrate according to a second aspect of the invention to solve the above problem is the method of forming reinforcing fiber substrate according to the first aspect of the invention, characterized in that perimeter difference to absorb a length of the film is provided near the mold.

A method of forming reinforcing fiber substrate according to a third aspect of the invention to solve the above problem is the method of forming reinforcing fiber substrate according to the first aspect of the invention, characterized in that the method comprises:

arranging, on the mold having a projection with a flat upper surface narrower than the fiber preform in a cross-sectional view taken in a width direction, a platform that is adjacent to the projection and has a flat upper surface at the same height as the upper surface of the projection;

forming the fiber preform by placing reinforcing fiber substrate in layers on the upper surface of the projection;

placing an end of the fiber preform in the width direction extending out of the upper surface of the projection, on the upper surface of the platform, with the end of the fiber preform in the width direction sandwiched in a vertical direction by a pair of the films of which outer ends in the width direction are fixed to each other; and removing the platform and pulling out the pair of the films while shaping the fiber preform along the projection.

A method of forming reinforcing fiber substrate according to a fourth aspect of the invention to solve the above problem is the method of forming reinforcing fiber substrate according to the second aspect of the invention, characterized in that the method comprises:

arranging a block having an upper surface with which a pair of the films come into contact, on a bottom surface of the mold after removing the platform; and causing the pair of the films to be pulled out by themselves while shaping the fiber preform along the projection, by sealing the fiber preform, the pair of the films, and the block with a bag film and then performing evacuation.

A method of forming reinforcing fiber substrate according to a fifth aspect of the invention to solve the above problem is the method of forming reinforcing fiber substrate according to the fourth aspect of the invention, characterized in that the sealing is performed with the bag film in a state where outer ends of the pair of the films in a width direction are fixed on the bottom surface, and then the evacuation is performed.

A method of forming reinforcing fiber substrate according to a sixth aspect of the invention to solve the above problem is the method of forming reinforcing fiber substrate according to the fourth or fifth aspect of the invention, characterized in that the block has an upper surface in an arc shape in a cross-sectional view taken in a width direction.

Effect of the Invention

The methods of forming reinforcing fiber substrate according to the present invention make it possible to shape the fiber preform surely without the layers of the fiber preform getting loose and prevent the degradation of the strength of the preform member.

MODE FOR CARRYING OUT THE INVENTION

Hereinafter, using the drawings, description will be provided for methods of forming reinforcing fiber substrate according to the present invention by showing examples.

Example 1

A method of forming reinforcing fiber substrate according to this example is about steps for forming a U-shaped preform member called SPAR (a layup process and a shaping step). In this example, steps from the layup process to the shaping step are subdivided into seven steps in total. Hereinafter, the method of forming reinforcing fiber substrate according to this example will be described using FIGS. 1 to 7.

Figure 1:
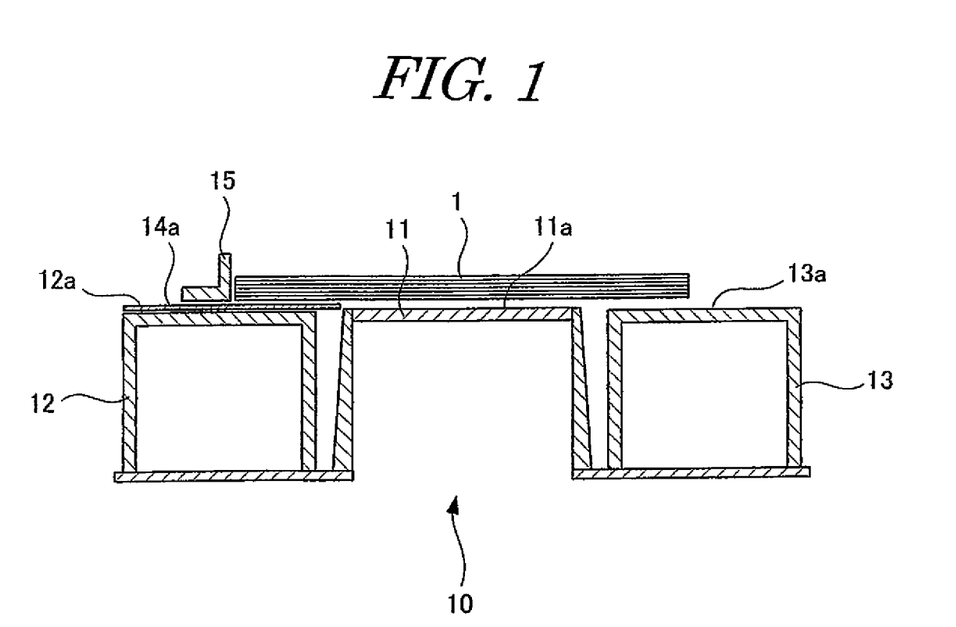
FIG. 1 is a schematic cross-sectional view taken in the width direction for explaining the first step in a method of forming reinforcing fiber substrate according to example 1 of the present invention.

The first step is a step for setting some polyester films and forming a fiber preform. FIG. 1 is a schematic cross-sectional view taken in the width direction for explaining the first step of the method of forming reinforcing fiber substrate according to the example of the present invention. First, FIG. 1 shows a mold 10 and platforms 12 and 13.

The mold 10 has a projection 11 having a flat upper surface narrower than the width of a fiber preform 1 for molding. The platforms 12 and 13 are arranged on the mold 10 so as to be adjacent to both sides of the projection 11. The upper surfaces 12a and 13a of the platforms 12 and 13 are flat and at the same height as the upper surface 11a of the projection 11. Note that it is assumed that the mold 10, the projection 11, and the platforms 12 and 13 extend for a length longer than or equal to that of the fiber preform 1 in the direction perpendicular to the paper surface which is the longitudinal direction.

At the first step, a polyester film 14a is placed on the upper surface 12a of the platform 12 on one side, and reinforcing fiber substrate is placed in layers on the upper surface 11a of the projection 11 to form the fiber preform 1. Here, one end of the fiber preform 1 in the width direction, extending out of the upper surface 11a to the platform 12 side is placed on the polyester film 14a. The other end of the fiber preform 1 extending out of the upper surface 11a to the platform 13 side is placed on the upper surface 13a of the platform 13.

On the polyester film 14a is arranged a positioning guide 15, which adjusts the one end side of the fiber preform 1 in the width direction, allowing the fiber preform 1 to be placed at a desired position. Note that this "desired position" means a position at which the fiber preform 1 is symmetrical in the illustrated cross-sectional views, in other words, the lengths of the one end and the other end of the fiber preform 1 in the width direction, extending out of the upper surface 11a are the same as each other, and in addition, the "desired position" also means an angle at which the longitudinal direction of the fiber preform 1, which is the direction perpendicular to the paper surface, is in parallel with the longitudinal direction of the mold 10, the projection 11, and the platforms 12 and 13.

It is assumed that in the width direction, the polyester film 14a is arranged to span a small gap between the projection 11 and the platform 12 such that there is no gap between the polyester film 14a and the projection 11, and that in the direction perpendicular to the paper surface, which is the longitudinal direction, the polyester film 14a extends for a length longer than or equal to the fiber preform 1.

Figure 2:
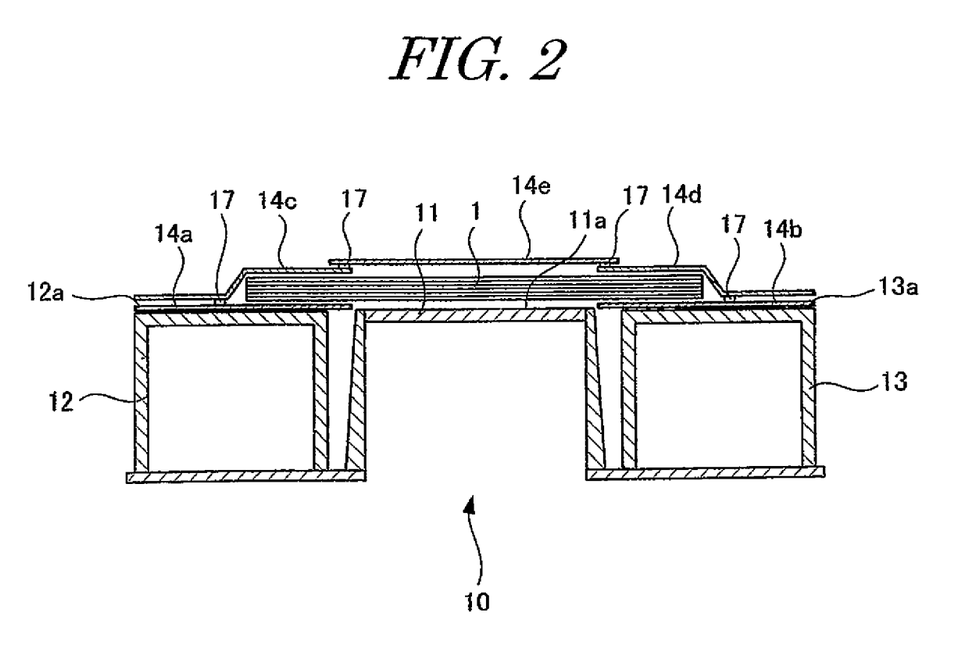
FIG. 2 is a schematic cross-sectional view taken in the width direction for explaining the second step in the method of forming reinforcing fiber substrate according to example 1 of the present invention.

The second step is a step for completing setting polyester films. FIG. 2 is a schematic cross-sectional view taken in the width direction for explaining the second step in the method of forming reinforcing fiber substrate according to the example of the present invention.

At the second step, first, a polyester film 14b is inserted between the other end of the fiber preform 1 in the width direction, extending out of the upper surface 11a and the upper surface 13a of the platform 13. This polyester film 14b is arranged in a symmetrical manner with the polyester film 14a. Note that the order of the arrangement of the polyester films 14a and 14b may be from either the right side or the left side, or it may be simultaneous.

Then, the positioning guide 15 is removed, and the one end of the fiber preform 1 in the width direction, extending out of the upper surface 11a is covered by a polyester film 14c from the upper surface side, and thus sandwiched by the polyester film 14a and the polyester film 14c from both sides in the vertical direction. The polyester films 14a and 14c are fixed to each other with a tape 17 at a portion where these films are directly in contact with each other (at the outer end of the fiber preform 1 in the width direction).

In addition, the same procedure is performed for the other end of the fiber preform 1 in the width direction, extending out of the upper surface 11a, using a polyester film 14d.

Note that the thickness of the fiber preform 1 illustrated in FIG. 2 is exaggerated for clear depiction, and the actual thickness is thinner than illustrated. Hence, actually, the polyester films 14c and 14d are not folded as in the illustration but are only slightly curved.

Then, a polyester film 14e is arranged to cover the upper surface of a portion of the fiber preform 1 over the projection 11. The polyester films 14e and 14c are fixed to each other with a tape 17 at their overlapping portion, and so are the polyester films 14e and 14d. This is done to prevent the polyester films 14a to 14d from sliding and falling down at the following third step.

Figure 3:
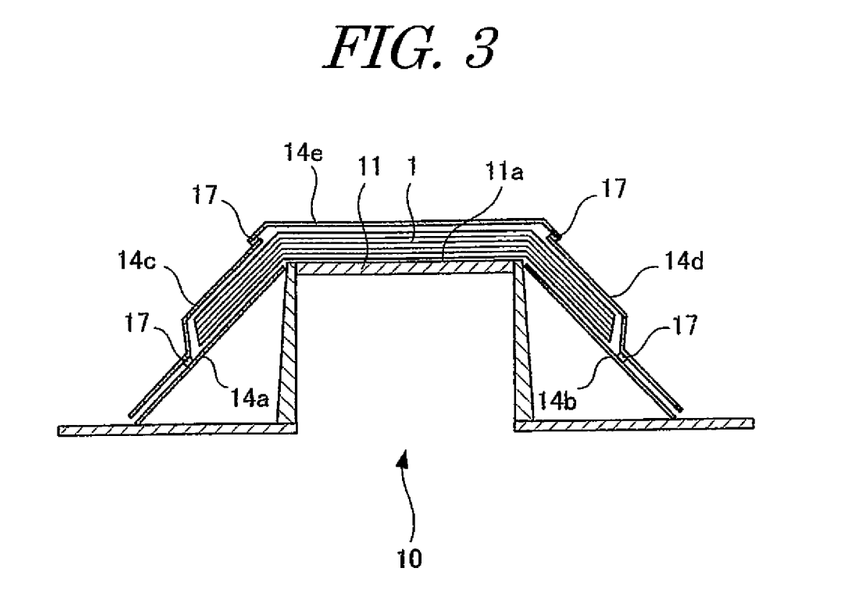
FIG. 3 is a schematic cross-sectional view taken in the width direction for explaining the third step in the method of forming reinforcing fiber substrate according to example 1 of the present invention.

Note that at the second and third steps the order of placing the polyester films 14a and 14b may be from either one of them, or it may be simultaneous.

The third step is a step for removing the platforms. FIG. 3 is a schematic cross-sectional view taken in the width direction for explaining the third step in the method of forming reinforcing fiber substrate according to the example of the present invention.

At the third step, when the platforms 12 and 13 are removed, both ends of the fiber preform 1 in the width direction, extending out of the upper surface 11a, are folded so as to be inclined downward in the vertical direction due to their own weights. In this state, since the polyester films 14a to 14e set at the second step are fixed to each other and cover the entire fiber preform 1 so as to sandwich the fiber preform 1, the layers (in particular, at both ends in the width direction) of the fiber preform 1 will not get loose.

Figure 4:
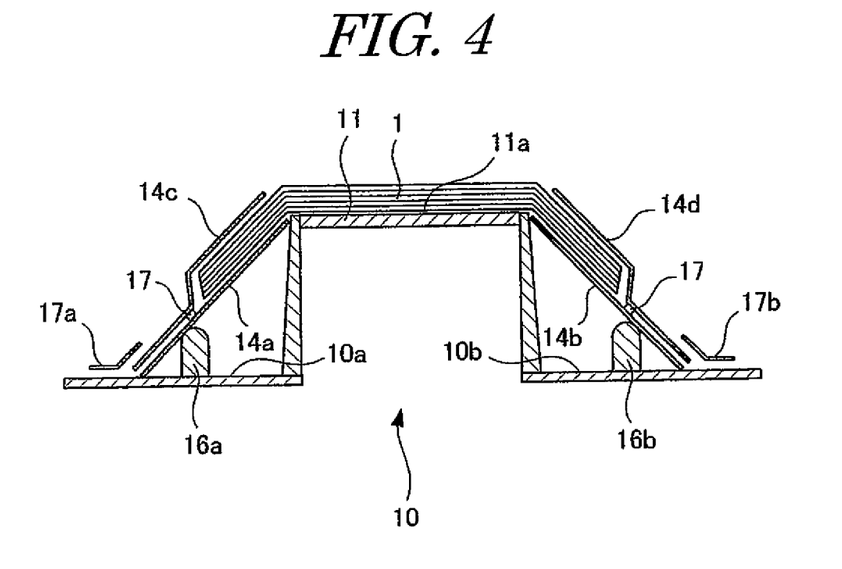
FIG. 4 is a schematic cross-sectional view taken in the width direction for explaining the fourth step in the method of forming reinforcing fiber substrate according to example 1 of the present invention.

The fourth step is a step for setting blocks and fixing the polyester films to the mold. FIG. 4 is a schematic cross-sectional view taken in the width direction for explaining the fourth step in the method of forming reinforcing fiber substrate according to the example of the present invention.

At the fourth step, first, a block 16a is inserted between the end of the polyester film 14a inclined at the third step and a bottom surface 10a of the mold 10, and a block 16b is inserted between the end of polyester film 14b inclined at the third step and a bottom surface 10b of the mold 10.

The block 16a is arranged on the bottom surface 10a of the mold 10, and the upper surface of the block 16a, having an arc shape in a cross-sectional view taken in the width direction, is in contact with the polyester film 14a. The length of the block 16a is longer than or equal to that of the polyester film 14a in the direction perpendicular to the paper surface, which is the longitudinal direction.

The block 16b is arranged on the bottom surface 10b of the mold 10, and the upper surface of the block 16b, having an arc shape in a cross-sectional view taken in the width direction, is in contact with the polyester film 14b. The length of the block 16b is longer than or equal to that of the polyester film 14b in the direction perpendicular to the paper surface, which is the longitudinal direction.

Note that the shapes of the blocks 16a and 16b in the cross-sectional view taken in the width direction are not limited to specific shapes, but may be, for example, triangular or circular.

Further, at the fourth step, the end of the polyester film 14c in the width direction is fixed to the bottom surface 10a with a tape 17a, and the end of polyester film 14d in the width direction is fixed to the bottom surface 10b with a tape 17b. As already described, since the polyester film 14c is fixed to the polyester film 14a, and the polyester film 14d is fixed to the polyester film 14b, fixing the polyester film 14c to the bottom surface 10a means that the polyester film 14a is also fixed to the bottom surface 10a, and fixing the polyester film 14d to the bottom surface 10b means that the polyester film 14b is also fixed to the bottom surface 10b.

At the fourth step, the polyester film 14e that has covered the upper surface 11a of the fiber preform 1 is removed. As already described, the polyester films 14a to 14d were held by the polyester film 14e not to slide and fall down. Now that the polyester films 14a to 14d are fixed with the tapes 17a and 17b, the polyester films 14a to 14d will not slide and fall down without the polyester film 14e.

Figure 5:
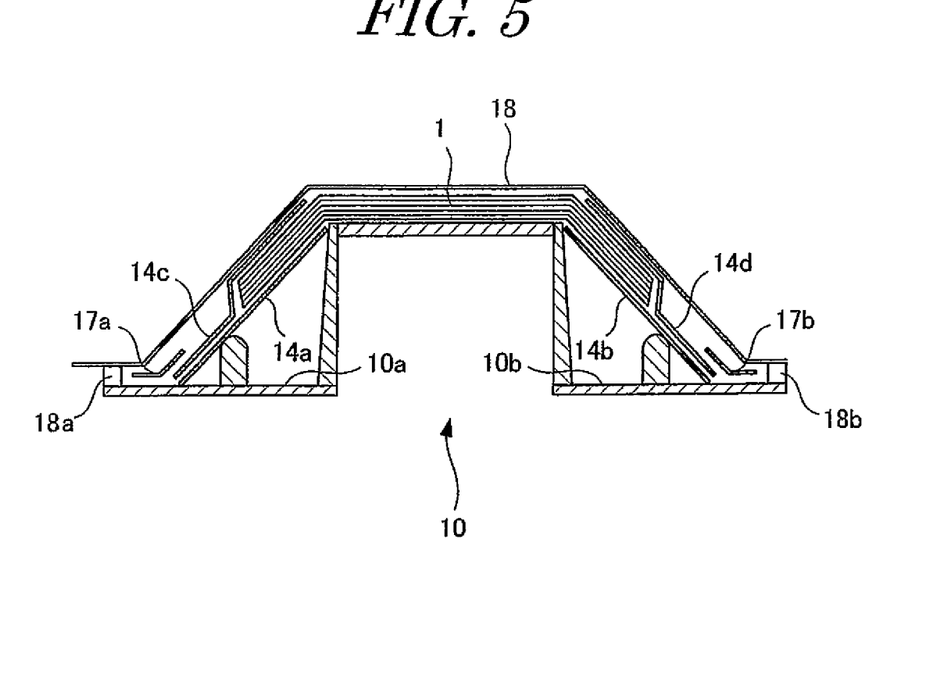
FIG. 5 is a schematic cross-sectional view taken in the width direction for explaining the fifth step in the method of forming reinforcing fiber substrate according to example 1 of the present invention.

The fifth step is a step for providing a rubber bag (bag film) for hot compaction. FIG. 5 is a schematic cross-sectional view taken in the width direction for explaining the fifth step in the method of forming reinforcing fiber substrate according to the example of the present invention.

A rubber bag 18 for hot compaction illustrated in FIG. 5 is used for shaping and performing a hot compaction step, in which the fiber preform 1 is sealed and the air inside is evacuated. The evacuation is performed through a not-illustrated suction port.

At the fifth step, the fiber preform 1, the polyester films 14a to 14d, the blocks 16a and 16b, and the tapes 17a and 17b are completely covered by the rubber bag 18 for hot compaction from the upper surface side of the fiber preform 1 and sealed. Note that the ends of the rubber bag 18 for hot compaction are in close contact with the bottom surfaces 10a and 10b of the mold 10 with stickers 18a and 18b.

Figure 6:
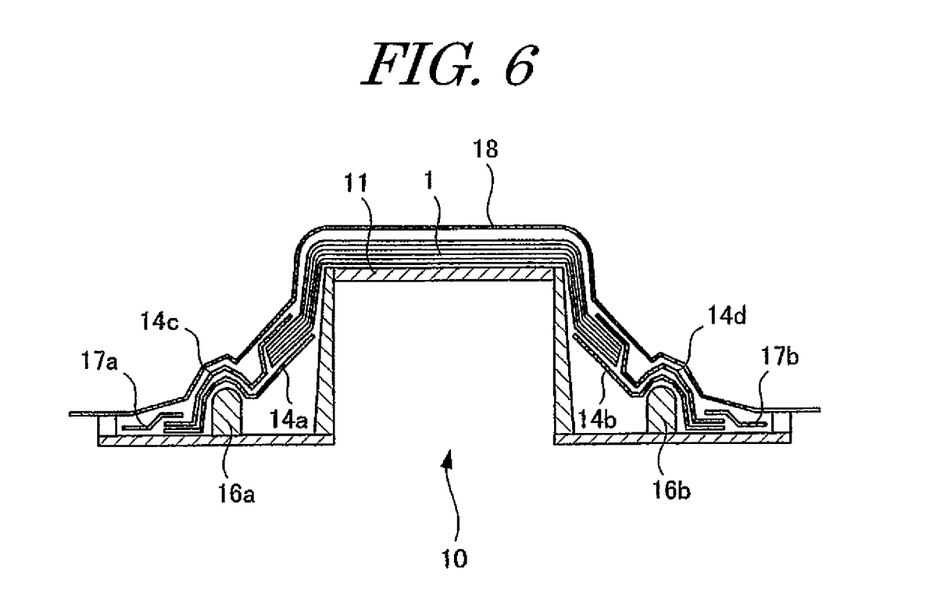
FIG. 6 is a schematic cross-sectional view taken in the width direction for explaining the sixth step in the method of forming reinforcing fiber substrate according to example 1 of the present invention.

The sixth step is a step for starting evacuation inside the rubber bag for hot compaction. The seventh step is a step for completing the evacuation inside the rubber bag for hot compaction and shaping of the fiber preform. FIG. 6 is a schematic cross-sectional view taken in the width direction for explaining the sixth step in the method of forming reinforcing fiber substrate according to the example of the present invention, and FIG. 7 is a schematic cross-sectional view taken in the width direction for explaining the seventh step in the method of forming reinforcing fiber substrate according to the example of the present invention.

FIG. 6 illustrates a state where the evacuation inside the rubber bag 18 for hot compaction is started to shape the fiber preform 1 along the projection 11 of the mold 10. At this time, the polyester films 14a and 14c that have sandwiched the one end of the fiber preform 1 in the width direction are caught by the block 16a, and the polyester films 14b and 14d that have sandwiched the other end of the fiber preform 1 in the width direction are caught by the block 16b. Then, these films move in the direction of coming off the fiber preform 1 (outward in the width direction).

Figure 7:
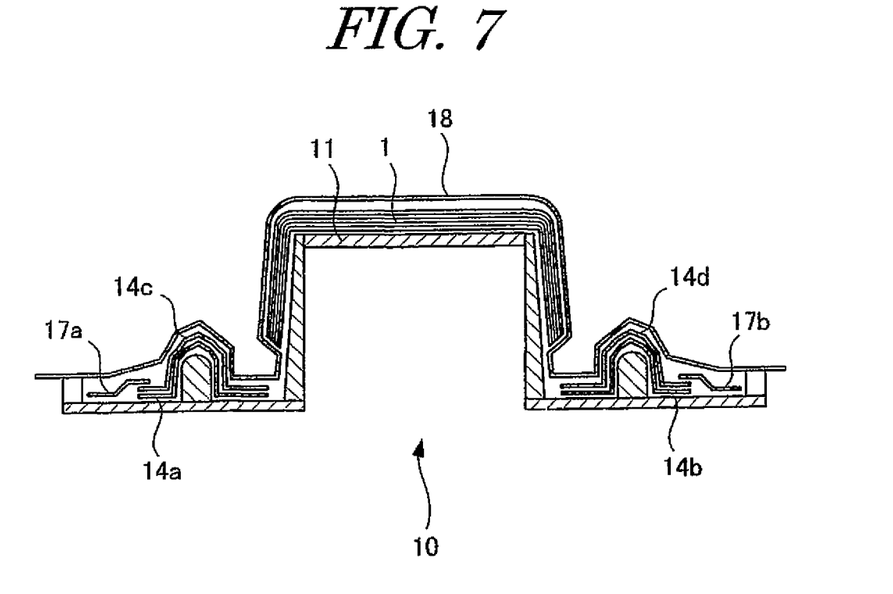
FIG. 7 is a schematic cross-sectional view taken in the width direction for explaining the seventh step in the method of forming reinforcing fiber substrate according to example 1 of the present invention.

FIG. 7 illustrates a state where the fiber preform 1 is completely shaped along the projection 11 of the mold 10, in other words, shaping of the fiber preform 1 has been completed. In this state, the polyester films 14a to 14d have completely moved away from the fiber preform 1 and are wound around the blocks 16a and 16b so as to cover them.

The method of forming reinforcing fiber substrate according to this example has been described above. In summary, in the method of forming reinforcing fiber substrate according to this example, since the ends of the fiber preform 1 are, first, sandwiched by the polyester films 14a to 14d; when the platforms 12 and 13 are removed, the layers of the fiber preform 1 do not get loose, making it possible to surely perform shaping and to prevent degradation of the strength of the preform member.

In addition, in the method of forming reinforcing fiber substrate according to this example, since the blocks 16a and 16b are provided to perform the evacuation, the polyester films 14a to 14d can be pulled out by themselves without manual work while the shaping is being performed. Thus, also in this step, the fiber preform 1 can be completely shaped along the projection 11 of the mold 10 without the layers of the fiber preform 1 getting loose, making it possible to surely perform shaping and to prevent degradation of the strength of the preform member.

In addition, fixing the outer ends of the polyester films 14a to 14d in the width direction to the bottom surfaces 10a and 10b of the mold 10 with the tapes 17a and 17b, prevents the polyester films 14a to 14d from moving and falling down and thus prevents the layers of the fiber preform 1 from getting loose before shaping, which makes it possible to surely perform shaping and to prevent degradation of the strength of the preform member.

Further, since the cross-sections in the width direction of the upper surfaces of the blocks 16a and 16b have arc shapes, the polyester films 14a to 14d are surely pulled out in the evacuation. Here, if the shapes are shapes that cause perimeter difference, this is not the case.

Example 2

A method of forming reinforcing fiber substrate according to this example is about steps for forming a preform member with an L shape (a layup process and a shaping step). In this example, steps from the layup process to the shaping step are subdivided into seven steps in total, as in example 1. Hereinafter, the method of forming reinforcing fiber substrate according to this example will be described using FIGS. 8 to 14.

Figure 8:
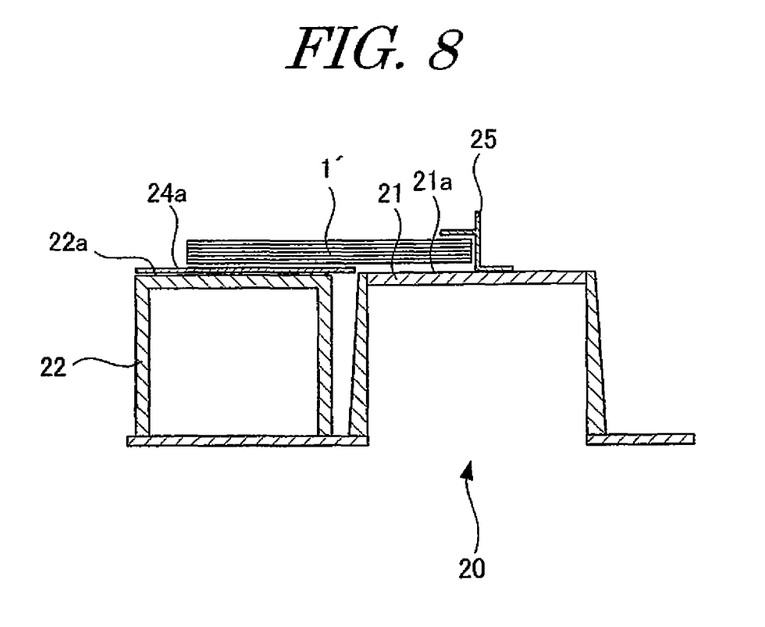
FIG. 8 is a schematic cross-sectional view taken in the width direction for explaining the first step in a method of forming reinforcing fiber substrate according to example 2 of the present invention.

The first step is a step for setting some polyester films and forming a fiber preform. FIG. 8 is a schematic cross-sectional view taken in the width direction for explaining the first step of the method of forming reinforcing fiber substrate according to the example of the present invention. First, FIG. 8 shows a mold 20 and a platform 22.

The mold 20 has a projection 21 having a flat upper surface. The platform 22 is arranged on the mold 20 so as to be adjacent to one side of the projection 21. The upper surface 22a of the platform 22 is flat and at the same height as the upper surface 21a of the projection 21. Note that it is assumed that the mold 20, the projection 21, and the platform 22 extend for a length longer than or equal to that of a fiber preform 1' in the direction perpendicular to the paper surface which is the longitudinal direction.

At the first step, a polyester film 24a is placed on the upper surface 22a of the platform 22 on one side, and reinforcing fiber substrate is placed in layers on the upper surface 21a of the projection 21 to form the fiber preform 1'. Here, one end of the fiber preform 1' in the width direction, extending out of the upper surface 21a to the platform 22 side is placed on the polyester film 24a, and the other end of the fiber preform 1' in the width direction is placed on the upper surface 21a the projection 21.

On the upper surface 21a of the projection 21 is arranged a positioning guide 25, which adjusts the other end of the fiber preform 1' in the width direction, allowing the fiber preform 1' to be placed at a desired position. Note that that this "desired position" means an angle at which the longitudinal direction of the fiber preform 1', which is the direction perpendicular to the paper surface, is in parallel with the longitudinal direction of the mold 20, the projection 21, and the platform 22.

Figure 15:
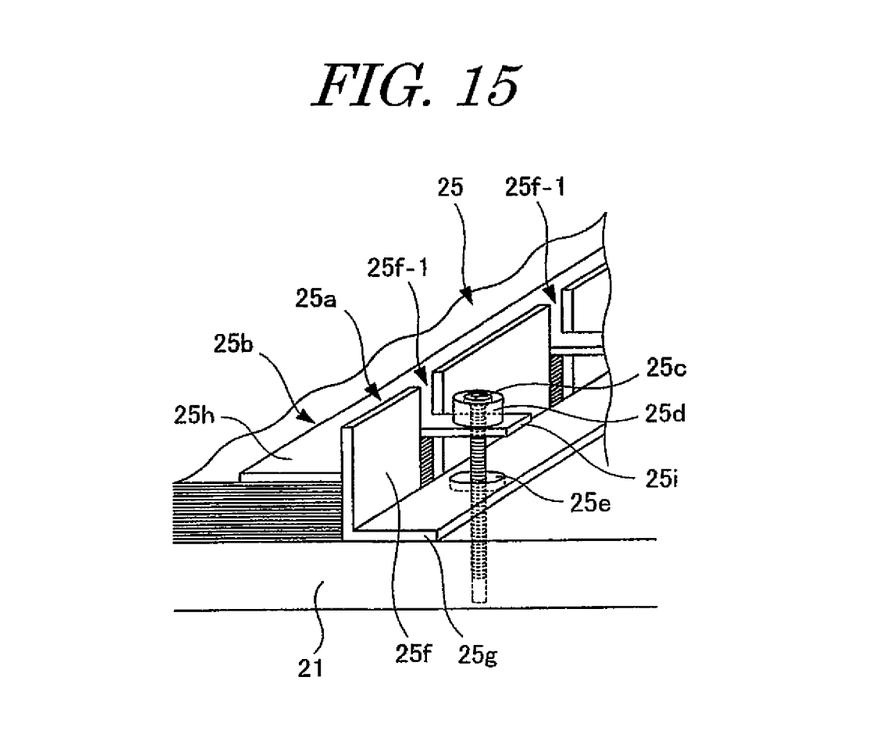
FIG. 15 is an enlarged perspective view of a positioning guide in example 2 of the present invention.

Here, the positioning guide 25 will be described in detail using an enlarged perspective view of the positioning guide 25 in FIG. 15. First, the positioning guide 25 has a positioning guide piece 25a and a plate 25b which extend in the direction perpendicular to the paper surface of FIG. 8.

The positioning guide piece 25a has an L shape having a vertical surface 25f and a horizontal surface 25g. The vertical surface 25f has multiple cut portions 25f-1 formed to be aligned in the longitudinal direction of the positioning guide piece 25a at specified intervals, and the horizontal surface 25g has slits 25e.

The plate 25b has a plate portion 25h that presses the upper surface of the other end of the fiber preform 1' in the width direction and also has horizontal protrusions 25i that are engaged with the cut portions of the positioning guide piece 25a (from the side opposite from the horizontal surface 25g).

Portions of the horizontal protrusions 25i protruding from the cut portions 25f-1 toward above the horizontal surface 25g are fixed to the projection 21 with screws 25c via the slits 25e of the horizontal surface 25g (note that spacers 25d are arranged between the head portions of the screws 25c and the horizontal protrusions 25i and that the width of the slit 25e has a margin relative to the screw 25c in the width direction of the fiber preform 1').

Here, the screws 25c do not pass through the projection 21, to achieve airtightness in a vacuum operation at a step described later.

This structure of the positioning guide 25 makes it possible to press the upper surface of the fiber preform 1' while positioning the other end of the fiber preform 1' in the width direction, regardless of the thickness of the fiber preform 1'.

It is assumed that in the width direction, the polyester film 24a is arranged to span a small gap between the projection 21 and the platform 22 such that there is no gap between the polyester film 24a and the projection 21, and that in the direction perpendicular to the paper surface, which is the longitudinal direction, the polyester film 24a extends for a length longer than or equal to the fiber preform 1'.

Figure 9:
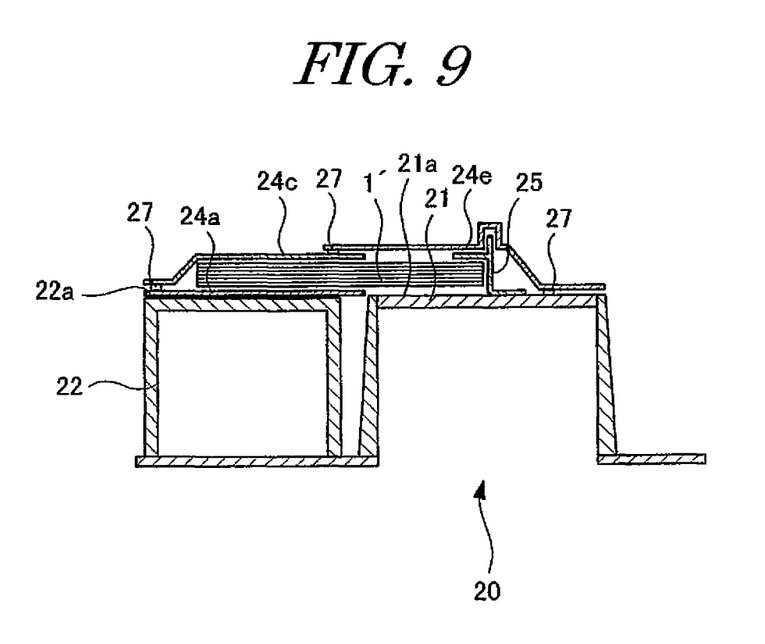
FIG. 9 is a schematic cross-sectional view taken in the width direction for explaining the second step in the method of forming reinforcing fiber substrate according to example 2 of the present invention.

The second step is a step for completing setting polyester films. FIG. 9 is a schematic cross-sectional view taken in the width direction for explaining the second step in the method of forming reinforcing fiber substrate according to the example of the present invention.

At the second step, the one end of the fiber preform 1' in the width direction, extending out of the upper surface 21a, is covered by a polyester film 24c from the upper surface and thus sandwiched by the polyester film 24a and the polyester film 24c from both sides in the vertical direction. The polyester film 24a and the polyester film 24c are fixed to each other with a tape 27 at a portion where these films are directly in contact with each other (at the outer end of the fiber preform 1' in the width direction).

Note that the thickness of the fiber preform 1' illustrated in FIG. 9 is exaggerated for clear depiction, and the actual thickness is thinner than illustrated. Hence, actually, the polyester film 24c is not folded as in the illustration but is only slightly curved.

Then, a polyester film 24e is arranged to cover the upper surface of a portion of the fiber preform 1' over the projection 21. The polyester film 24e and the polyester film 24c are fixed to each other with a tape 27 at their overlapping portion, and the other end of the polyester film 24e in the width direction is fixed to the upper surface 21a of the projection 21 with a tape 27. This is done to prevent the polyester films 24a and 24c from sliding and falling down at the following third step.

Figure 10:
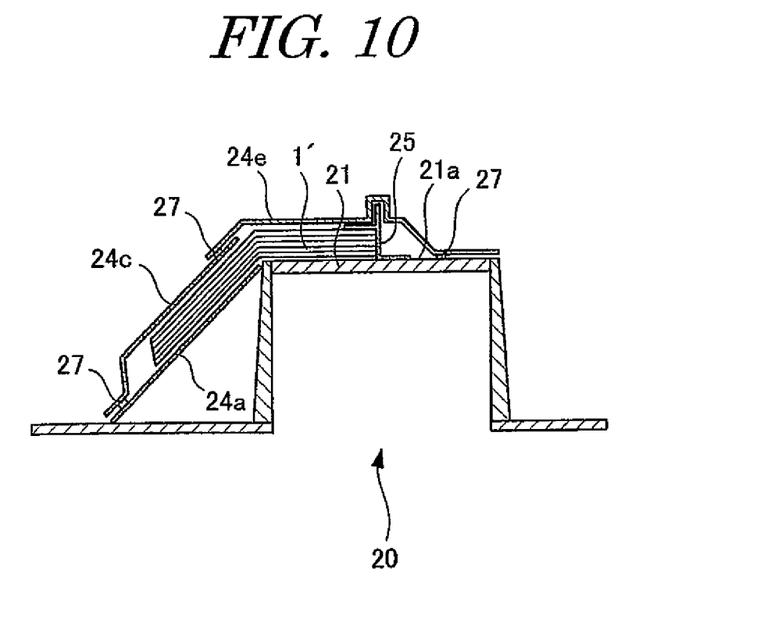
FIG. 10 is a schematic cross-sectional view taken in the width direction for explaining the third step in the method of forming reinforcing fiber substrate according to example 2 of the present invention.

The third step is a step for removing the platform. FIG. 10 is a schematic cross-sectional view taken in the width direction for explaining the third step in the method of forming reinforcing fiber substrate according to the example of the present invention.

At the third step, when the platform 22 is removed, the one end of the fiber preform 1' in the width direction, extending out of the upper surface 21a, is folded so as to be inclined downward in the vertical direction due to its own weight. In this state, since the polyester films 24a, 24c, and 24e set at the second step are fixed to each other and cover the entire fiber preform 1' so as to sandwich it, the layers (in particular, at both ends in the width direction) of the fiber preform 1' will not get loose.

Figure 11:
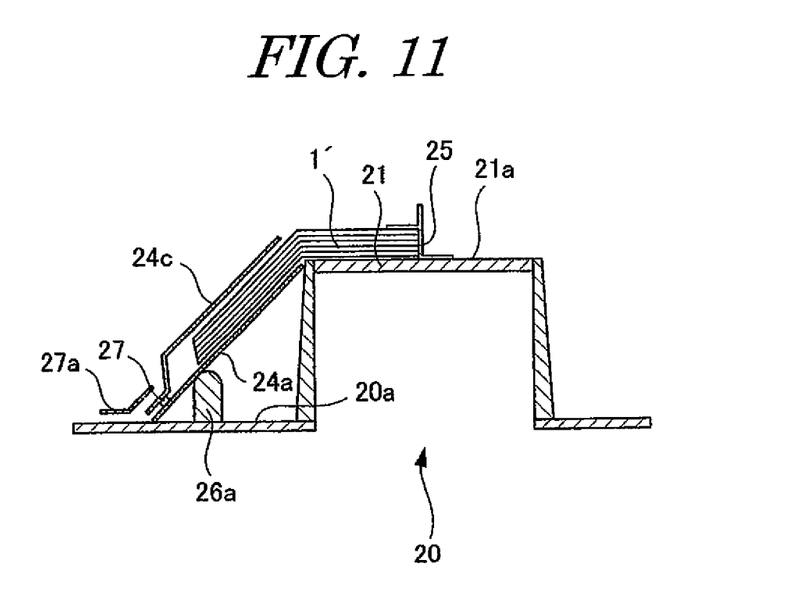
FIG. 11 is a schematic cross-sectional view taken in the width direction for explaining the fourth step in the method of forming reinforcing fiber substrate according to example 2 of the present invention.

The fourth step is a step for setting a block and fixing the polyester films to the mold. FIG. 11 is a schematic cross-sectional view taken in the width direction for explaining the fourth step in the method of forming reinforcing fiber substrate according to the example of the present invention.

At the fourth step, first, a block 26a is inserted between the end of the polyester film 24a inclined at the third step and a bottom surface 20a of the mold 20.

The block 26a is arranged on the bottom surface 20a of the mold 20, and the upper surface of the block 26a, having an arc shape in a cross-sectional view taken in the width direction, is in contact with the polyester film 24a. The length of the block 26a is longer than or equal to that of the polyester film 24a in the direction perpendicular to the paper surface, which is the longitudinal direction. Here, the shape of the block 26a in the cross-sectional view taken in the width direction is not limited to specific shapes, but may be, for example, triangular or circular.

Further, at the fourth step, the end of the polyester film 24c in the width direction is fixed to the bottom surface 20a with a tape 27a. As already described, since the polyester film 24c is fixed to the polyester film 24a, fixing the polyester film 24c to the bottom surface 20a means that the polyester film 24a is also fixed to the bottom surface 20a.

At the fourth step, the polyester film 24e that has covered the upper surface 21a of the fiber preform 1' is removed. As already described, the polyester films 24a and 24c were held by the polyester film 24e not to slide and fall down. Now that the polyester films 24a and 24c are fixed with the tape 27a, the polyester films 24a and 24c will not slide and fall down without the polyester film 24e.

Figure 12:
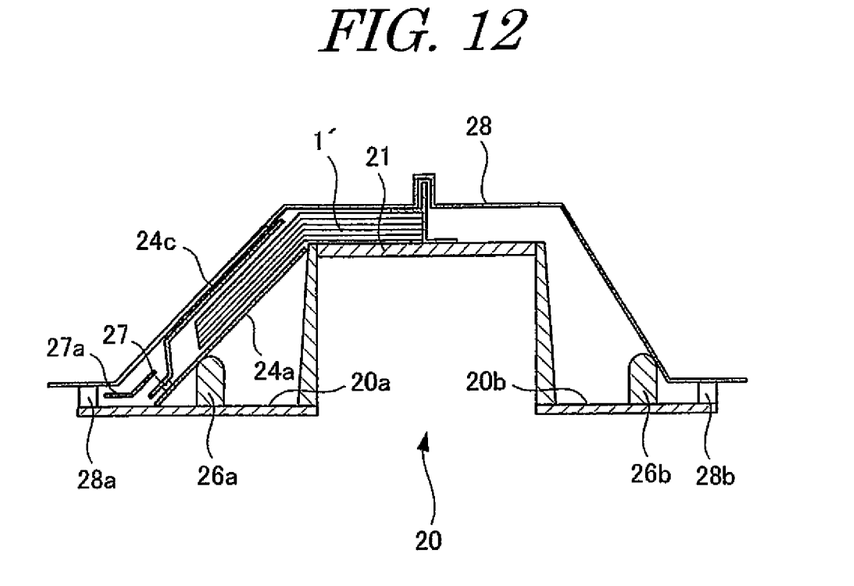
FIG. 12 is a schematic cross-sectional view taken in the width direction for explaining the fifth step in the method of forming reinforcing fiber substrate according to example 2 of the present invention.

The fifth step is a step for providing a rubber bag (bag film) for hot compaction. FIG. 12 is a schematic cross-sectional view taken in the width direction for explaining the fifth step in the method of forming reinforcing fiber substrate according to the example of the present invention.

A rubber bag 28 for hot compaction illustrated in FIG. 12 is used for shaping and performing a hot compaction step, in which the fiber preform 1' is sealed and the air inside is evacuated. The evacuation is performed through a not-illustrated suction port.

At the fifth step, the fiber preform 1', the polyester films 24a and 24c, the block 26a, and the tape 27a are completely covered by the rubber bag 28 for hot compaction from the upper surface side of the fiber preform 1' and sealed. Note that the rubber bag 28 for hot compaction covers not only the bottom surface 20a of the mold 20 but a bottom surface 20b opposite from the bottom surface 20a, and the ends of the rubber bag 28 are in close contact with the bottom surfaces 20a and 20b with stickers 28a and 28b. In this step, a block 26b having the same shape as the block 26a is provided on the bottom surface 20b, and the block 26b is also covered completely by the rubber bag 28 for hot compaction.

Figure 13:
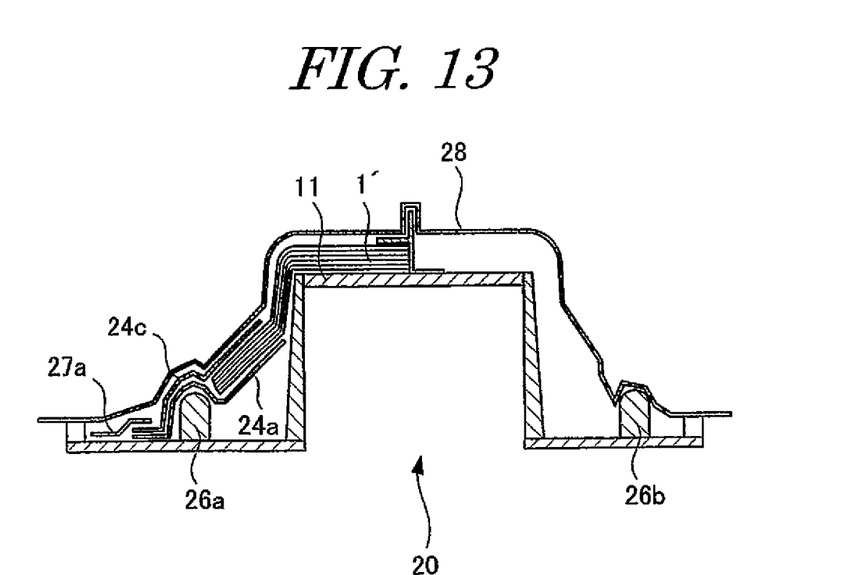
FIG. 13 is a schematic cross-sectional view taken in the width direction for explaining the sixth step in the method of forming reinforcing fiber substrate according to example 2 of the present invention.

The sixth step is a step for starting evacuation inside the rubber bag for hot compaction. The seventh step is a step for completing the evacuation inside the rubber bag for hot compaction and shaping of the fiber preform. FIG. 13 is a schematic cross-sectional view taken in the width direction for explaining the sixth step in the method of forming reinforcing fiber substrate according to the example of the present invention, and FIG. 14 is a schematic cross-sectional view taken in the width direction for explaining the seventh step in the method of forming reinforcing fiber substrate according to the example of the present invention.

FIG. 13 illustrates a state where the evacuation inside the rubber bag 28 for hot compaction is started to shape the fiber preform 1' along the projection 21 of the mold 20. At this time, the polyester films 24a and 24c that have sandwiched the one end of the fiber preform 1' in the width direction are caught by the block 26a. Then, these films move in the direction of coming off the fiber preform 1' (outward in the width direction). In this state, the evacuation is performed while the positioning guide 25 is pressing the upper surface of the other end of the fiber preform 1' in the width direction, and the rubber bag 28 for hot compaction presses the surface of the fiber preform 1' that is in contact with the rubber bag 28 for hot compaction, to the mold 20. Thus, the other end of the fiber preform 1' in the width direction will not be apart from the positioning guide 25.

Figure 14:
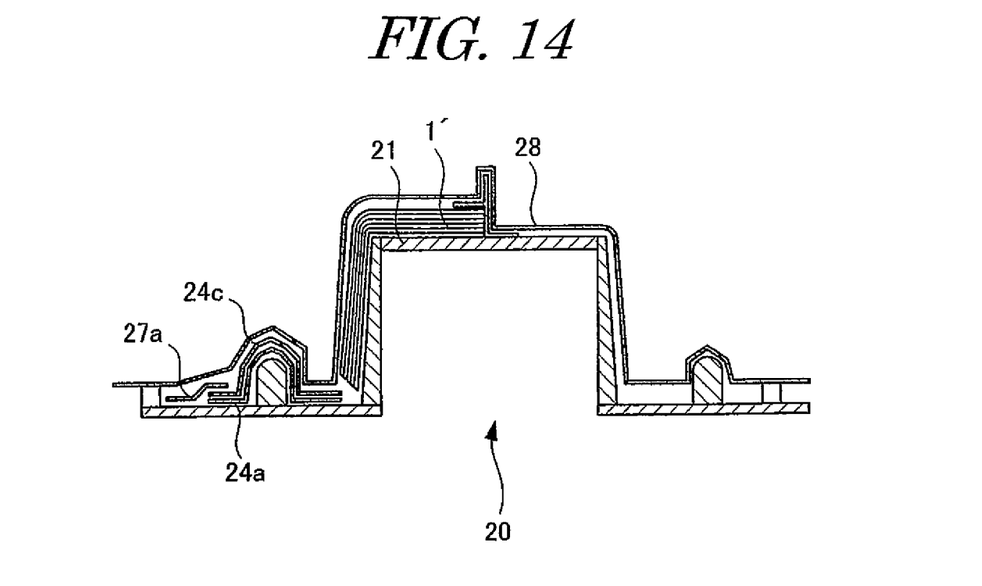
FIG. 14 is a schematic cross-sectional view taken in the width direction for explaining the seventh step in the method of forming reinforcing fiber substrate according to example 2 of the present invention.

FIG. 14 illustrates a state where the shape of the fiber preform 1' is completely shaped along the projection 21 of the mold 20, in other words, shaping of the fiber preform 1' has been completed. In this state, the polyester films 24a and 24c have completely moved away from the fiber preform 1' and are wound around the block 26a so as to cover it.

The method of forming reinforcing fiber substrate according to this example has been described above. In summary, in the method of forming reinforcing fiber substrate according to this example, since the end of the fiber preform 1' is, first, sandwiched by the polyester films 24a and 24c; when the platform 22 is removed, the layers of the fiber preform 1' do not get loose, making it possible to surely perform shaping and to prevent degradation of the strength of the preform member.

In addition, in the method of forming reinforcing fiber substrate according to this example, since the block 26a is provided to perform the evacuation, the polyester films 24a and 24c can be pulled out by themselves without manual work while the shaping is being performed. Thus, also in this step, the fiber preform 1' can be completely shaped along the projection 21 of the mold 20 without the layers of the fiber preform 1' getting loose, making it possible to surely perform shaping and to prevent degradation of the strength of the preform member.

In addition, fixing the outer ends of the polyester films 24a and 24c in the width direction to the bottom surface 20a of the mold 20 with the tape 27a, prevents the polyester films 24a and 24c from moving and falling down and thus prevents the layers of the fiber preform 1' from getting loose before shaping, which makes it possible to surely perform shaping and to prevent degradation of the strength of the preform member.

Further, since the cross-section in the width direction of the upper surface of the block 26a has an arc shape, the polyester films 24a and 24c are surely pulled out in the evacuation. Here, if the shape is a shape that causes perimeter difference, this is not the case.

INDUSTRIAL APPLICABILITY

The present invention is suitable as methods of forming reinforcing fiber substrate mainly in the VaRTM method.

REFERENCE SIGNS LIST 1, 1' fiber preform
10, 20 mold
10a, 10b, 20a, 20b bottom surface (of mold 10, 20)
11, 21 projection
11a, 21a upper surface (of projection 11, 21)
12, 13, 22 platform
12a, 13a, 22a upper surface (of platform 12, 13, 22)
14a to 14e, 24a, 24c, 24e polyester film
15, 25 positioning guide
25a positioning guide piece
25b plate
25c screw
25d spacer
25e slit
25f vertical surface
25f-1 cut portion
25g horizontal surface
25h plate portion
25i horizontal protrusion
16a, 16b, 26a, 26b block
17, 27 tape
17a, 17b, 27a, 27b tape
18, 28 rubber bag for hot compaction (bag film)
18a, 18b, 28a, 28b sticker

The invention claimed is:

1. A method of forming reinforcing fiber substrate, comprising:
    shaping a fiber preform along a mold while pulling out films that sandwich an end of the fiber preform from above and below.

2. The method of forming reinforcing fiber substrate according to claim 1, wherein
    a perimeter difference member for consuming a length of the film is provided near the mold.

3. The method of forming reinforcing fiber substrate according to claim 1, wherein the method comprises:
    arranging, on the mold having a projection that has a flat upper surface on the projection that is narrower than the fiber preform in a cross-sectional view in a width direction, a platform that is adjacent to the projection and that has a flat upper surface on the platform that is at a same height as the upper surface of the projection;
    forming the fiber preform by placing layers of the reinforcing fiber substrate on the upper surface of the projection;
    placing a width-direction end of the fiber preform extending out of the upper surface of the projection, on the upper surface of the platform, so the width-direction end of the fiber preform is sandwiched in a vertical direction by a pair of the films such that outer ends of each of the pair of the films in the width direction are fixed;
    removing the platform; and
    pulling out the pair of the films while shaping the fiber preform along the projection.

4. The method of forming reinforcing fiber substrate according to claim 3, wherein the method comprises:
    arranging a block having an upper surface that contacts the pair of the films on a bottom surface of the mold after removing the platform; and
    pulling out each of the pair of the films while shaping the fiber preform along the projection by sealing the fiber preform, the pair of the films, and the block with a bag film and then performing an evacuation.

5. The method of forming reinforcing fiber substrate according to claim 4, wherein
    the sealing is performed with the bag film configured so the outer ends of the pair of the films in the width direction are fixed on the bottom surface, and
    the sealing is performed prior to the evacuation.

6. The method of forming reinforced fiber base material according to claim 4, wherein
    an upper surface of the block has an arc shape in the cross-sectional view in the width direction.

7. The method of forming reinforced fiber base material according to claim 5, wherein
    an upper surface of the block has an arc shape in the cross-sectional view in the width direction.

* * * * *